United States Patent
Schleith et al.

(10) Patent No.: US 9,243,932 B2
(45) Date of Patent: Jan. 26, 2016

(54) MEASURING DEVICE FOR MEASURING A PRECESS VARIABLE IN INDUSTRIAL MEASUREMENTS AND CONTROL TECHNOLOGY

(75) Inventors: Christoph Schleith, Zell i. W. (DE); Bernd Strutt, Steinen (DE); Ralf Armbruster, Schallstadt (DE); Wolfgang Brutschin, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 153 days.

(21) Appl. No.: 13/996,000

(22) PCT Filed: Dec. 1, 2011

(86) PCT No.: PCT/EP2011/071461
§ 371 (c)(1),
(2), (4) Date: Jun. 20, 2013

(87) PCT Pub. No.: WO2012/084444
PCT Pub. Date: Jun. 28, 2012

(65) Prior Publication Data
US 2013/0271156 A1    Oct. 17, 2013

(30) Foreign Application Priority Data
Dec. 22, 2010   (DE) .......................... 10 2010 063 949

(51) Int. Cl.
| | |
|---|---|
| *G01R 27/02* | (2006.01) |
| *G01D 5/12* | (2006.01) |
| *G05B 19/042* | (2006.01) |
| *H04Q 9/00* | (2006.01) |

(52) U.S. Cl.
CPC ................ *G01D 5/12* (2013.01); *G05B 19/042* (2013.01); *H04Q 9/00* (2013.01); *H04Q 2209/84* (2013.01)

(58) Field of Classification Search
None
See application file for complete search history.

(56) References Cited

U.S. PATENT DOCUMENTS

| | | | |
|---|---|---|---|
| 6,577,989 B2 | 6/2003 | Florin | |
| 6,703,943 B1 | 3/2004 | Lalla et al. | |
| 8,310,088 B2 | 11/2012 | Kah et al. | |
| 2005/0030186 A1* | 2/2005 | Huisenga et al. | 340/635 |
| 2009/0253388 A1 | 10/2009 | Kielb et al. | |
| 2009/0309558 A1* | 12/2009 | Kielb | 323/234 |
| 2011/0187205 A1 | 8/2011 | Karbula | |

FOREIGN PATENT DOCUMENTS

| | | |
|---|---|---|
| CN | 1313978 A | 9/2001 |
| CN | 1568490 A | 1/2005 |
| CN | 101484862 A | 7/2009 |

(Continued)

OTHER PUBLICATIONS

German Search Report dated Oct. 20, 2011, issued in Munich, Germany, in Application No. 10 2010 063 949.4.

(Continued)

*Primary Examiner* — Minh N Tang
(74) *Attorney, Agent, or Firm* — Bacon & Thomas, PLLC

(57) ABSTRACT

A measuring device, comprising: an input circuit having a supply line and a return line. Energy supply occurs over a line-pair. Input voltage is applied to the measuring device via the line pair. A series regulator for controlling an electrical current flowing via the line-pair, a shunt regulator installed in a parallel branch, and an apparatus for controlling a voltage drop across the series regulator are provided.

12 Claims, 4 Drawing Sheets

(56) References Cited

FOREIGN PATENT DOCUMENTS

| DE | 34 40 888 A1 | 5/1986 |
| DE | 196 31 302 A1 | 2/1998 |
| DE | 10 2005 063 054 A1 | 7/2007 |
| DE | 10 2006 046 243 A1 | 4/2008 |
| DE | 10 2008 062 815 A1 | 6/2010 |
| WO | 00/75904 A1 | 12/2000 |
| WO | 02/07124 A1 | 1/2002 |
| WO | 0245045 A1 | 6/2002 |

OTHER PUBLICATIONS

International Preliminary Report dated Mar. 20, 2012, issued in Rijswijk, the Netherlands, in Application No. PCT/EP2011/071461.
International Preliminary Report dated Jul. 4, 2013, issued in Geneva, Switzerland, in Application No. PCT/EP2011/071461.

* cited by examiner

MEASURING DEVICE FOR MEASURING A PRECESS VARIABLE IN INDUSTRIAL MEASUREMENTS AND CONTROL TECHNOLOGY

TECHNICAL FIELD

The invention relates to a measuring device for measuring a process variable, wherein the measuring device includes a line-pair, namely a supply line and a return line, connectable to a superordinated unit. During operation, energy supply to the measuring device and signal transmission, especially of an output signal representing the process variable, between measuring device and superordinated unit occurs over the line-pair. During operation, an input voltage is applied to the measuring device via the line-pair. The measuring device further includes: an input circuit having a series regulator installed in the supply line for controlling an electrical current flowing via the line-pair, a shunt regulator connected after the series regulator and installed in a parallel branch connecting the supply line with the return line; and a measuring sensor connected to the input circuit and supplied with energy via the input circuit for measuring the process variable.

BACKGROUND DISCUSSION

Measuring devices of this type are applied especially in industrial measurements and control technology, as well as in automation and process control technology for measuring process variables.

As a function of the process variables to be measured, today, a great number of different measuring devices are applied for this, such as e.g. pressure-, temperature-, flow- and/or fill level measuring devices.

These measuring devices deliver an output signal, which corresponds to the measured value of the registered process variable. This output signal is transmitted in an industrial plant to a superordinated unit, e.g. a central control unit, such as e.g. a control room or a process control system, connected to the measuring device. As a rule, the entire process control of the manufacturing- and/or treatment process running in the industrial plant occurs via the superordinated unit, where the output signals of various measuring devices are evaluated and, based on the evaluation, control signals are produced for actuators, which control the process flow.

Preferably, measuring devices are applied, which are connectable to the superordinated unit via a single line-pair, via which the energy supply of the measuring device as well as also the signal transmission between the measuring device and the superordinated unit occurs.

The signal transmission of these devices, which are frequently referred to also as 2-wire measuring devices, occurs preferably according to standards usual in the industry.

According to one of these standards, the signal transmission occurs by setting the electrical current flowing via the line-pair from the measuring device to an electrical current value representing the measured process variable, which is then evaluated by the superordinated unit and correspondingly interpreted. For this, today, the electrical current is regularly controlled to values between 4 mA and 20 mA as a function of the measured process variable. Additionally, a communication signal can be superimposed on this electrical current representing the measured process variable. Thus, the electrical current is modulated about the value predetermined by the process variable in accordance with a predetermined communication protocol. Widely used for this today is the communication protocol defined by the HART standard, in the case of which there is superimposed on the electrical current lying between 4 mA and 20 mA a high-frequency oscillation of +/−0.5 mA carrying the information of the communication signal.

Forming another group are measuring devices connectable to a digital data bus. In the case of these measuring devices, the electrical current flowing through the line-pair is set to a predetermined electrical current value independently of the measured process variable, and there is superimposed on this electrical current the communication signal in the form a high-frequency oscillation. Known standards for this are the PROFIBUS, FOUNDATION FIELDBUS and CAN-BUS standards.

Measuring devices of this type usually have an input circuit with a line-pair composed of a supply line and a return line also connectable to the superordinated unit. During operation, energy supply of the measuring device and signal transmission, especially of an output signal representing the process variable, occurs between measuring device and superordinated unit on this line pair.

Connected to the input circuit is a measuring sensor supplied with energy via the input circuit and serving for determining the process variable and for producing a measurement signal representing the process variable.

The input circuit includes, for example, a series regulator installed in the supply line for controlling an electrical current flowing via the line-pair, and a shunt regulator connected after the series regulator and installed in a parallel branch connecting the supply line with the return line. The measuring sensor is connected to the input circuit behind the parallel branch in parallel with the shunt regulator. The shunt regulator is in the simplest case a Zener diode, via which the voltage applied to the input of the measuring sensor is predetermined.

Available to the measuring device via the line-pair is, as a rule, only a very limited amount of energy, as determined by the applied input voltage and the electrical current set by the series regulator.

Accordingly, today, especially in connection with measuring sensors with high energy requirement, such as e.g. measuring transducers of fill-level measuring devices working with microwaves or with ultrasound, methods are applied for efficient use of the available energy.

To this end, German Patent DE 10 2006 046 243 A1 discloses a method, in the case of which the measuring sensor is operated as needed, and, in times when it is not required, it is switched off or placed in a stand-by mode.

In international published application, WO 02/07124 A1, a measuring device for measuring a process variable is described, in the case of which the measurement activities of the measuring transducer are matched to the power available via the line-pair.

The measuring device includes a line-pair composed of a supply line and a return line connectable to a superordinated unit. During operation, energy supply of the measuring device and signal transmission, especially of a measurement signal, between measuring device and superordinated unit occurs via the line-pair, and an input voltage is applied to the measuring device. A measuring device variant is described, which has an input circuit with an electrical current stage installed in the supply line for controlling the electrical current flowing via the line-pair, as well as having a circuit connected after the electrical current stage and lying in a parallel branch connecting the supply line with the return line. This circuit serves to take exactly sufficient electrical current that the voltage drop across the electrical current stage is as small as possible for lessening the power loss. Correspondingly, the voltage drop across the electrical current stage is reduced to a minimum value required for operating the electrical current stage.

A further example of a measuring device is described in international published application WO 00/75904 A1. In this case, the energy supply and the output of the measured process variable occur via a single line-pair. Also in such case, the measuring device includes an input circuit, via which the thereto connected measuring sensor is supplied with energy. The input circuit includes an electrical current controller installed in the incoming supply line, which controls the electrical current flowing via the line-pair to a value representing the process variable. Behind the electrical current controller, a switching power supply is provided in the line-pair, via which the measuring transducer is fed. Also, in the case of this measuring device, the electrical current draw of the measuring sensor is controlled in such a manner for lessening the power loss that the voltage drop across the electrical current controller is as small as possible. In the case of switching power supplies with an input-side capacitance, abrupt changes of the electrical current value to be controlled could, due to the energy stored in the capacitor, lead to the fact that the output of the electrical current controller lies at a higher potential than its input. In order to prevent this, there is placed before the electrical current controller between the two lines of the line pair a further electrical current controller, which is used exclusively when required for preventing this problem.

The procedure described in the state of the art of holding the voltage drop across the input-side series regulator as small as possible offers the advantage that basically more energy is available for the measuring transducer.

It is, however, also, depending on application, connected with considerable disadvantages. One problem is that these measuring devices are more disturbance sensitive due to the small voltage drop across the series regulator. Thus, e.g. voltage fluctuations of the input voltage, such as can arise e.g. from external disturbances, from digital communication signals superimposed on a bus, or from fluctuations of the energy consumption of other bus participants connected to the same bus, can be cancelled less adequately by the series regulator, the lower the voltage drop across such is.

A further problem is that the input impedance of the measuring device is determined decisively by the voltage drop across the input-side series regulator.

A low input impedance leads, however, in the case of a connection of the measuring device to a bus, to an increased loading of the bus. If there are a number of measuring devices connected parallel to one another on a bus, then the maximum number of measuring devices connectable to the same bus is decisively limited by their input impedances. The lower the input impedances of the measuring devices, the smaller is the maximum number of connectable measuring devices parallel to one another on the same bus.

Moreover, low input impedances lead to an increased attenuation of communication signals superimposed on the electrical current flowing via the line-pair to be received by the measuring device.

SUMMARY OF THE INVENTION

To this end, the invention resides in a measuring device for measuring a process variable and comprising
an input circuit having
a line-pair, namely a supply line and a return line, connectable to a superordinated unit, wherein, during operation, energy supply to the measuring device and signal transmission, especially of a output signal representing the process variable, between measuring device and superordinated unit occurs over the line-pair, and wherein, during operation, an input voltage is applied to the measuring device via the line-pair,
a series regulator installed in the supply line for controlling an electrical current flowing via the line-pair,
a shunt regulator connected after the series regulator and installed in a parallel branch connecting the supply line with the return line, and
an apparatus for controlling a voltage drop across the series regulator, wherein the apparatus sets the voltage drop across the series regulator as a function of the applied input voltage for input voltages, which are greater than a predetermined minimum input voltage, to a value predetermined by a characteristic curve for the particular input voltage and lying above a minimum value required for operation of the series regulator, and
a measuring transducer connected to the input circuit and supplied with energy via the input circuit for measuring the process variable.

In a further development, the characteristic curve is a step shaped curve, which has a hysteresis in the region of at least one of the steps of the step shaped curve.

In an embodiment, the value of the voltage drop predetermined by the characteristic curve for input voltages, which lie above the predetermined minimum input voltage, rises with rising input voltage to a predetermined maximum value.

In an embodiment, the apparatus sets the voltage drop across the series regulator for input voltages, which lie below a predetermined minimum input voltage, to a minimum value required for operation of the series regulator.

In a first form of embodiment, the series regulator controls the electrical current as a function of a measurement signal of the measuring unit representing the measured process variable to a value representing the process variable.

In an embodiment applicable alternatively or supplementally to the first form of embodiment, the series regulator modulates the electrical current as a function of a signal to be transmitted from the measuring device to the superordinated unit.

In a further development, the apparatus for setting the voltage drop includes an intelligent electronics unit, especially a microprocessor or a microcontroller, which, by a corresponding operation of the shunt regulator, sets the voltage drop across the series regulator, based on the input voltage applied to the measuring device and the voltage drop across the series regulator, to the value predetermined by the characteristic curve.

In a first further development of the further development, the measuring device includes a receiving system, via which the characteristic curve can be specified to the intelligent electronics unit.

In a second further development of the further development, the measuring device includes a receiving system, via which the maximum value and/or an input voltage threshold, in the case of which the maximum value is reached, can be specified to the intelligent electronics unit.

In an additional further development,
a selection of different characteristic curves is stored in the measuring device, and
the measuring device includes a bidirectional communication system, via which the characteristic curve is selectable from the predetermined selection.

Additionally, the invention includes a measuring arrangement having at least one measuring device according to the first embodiment, in the case of which the measuring device is connected via its line-pair to a bus in parallel with at least one additional measuring device, and the maximum value is a value predetermined as a function of a number of the measuring devices connected to the bus parallel to one another.

A essential advantage of the invention is that the measuring devices have, due to the lifting of the voltage drop across the series regulator as a function of the input voltage to a value lying above the minimum voltage drop required for its operation, a clearly smaller disturbance susceptibility relative to fluctuations of the input voltage. The measuring device detects, based on the input voltage and the characteristic curve, automatically whether sufficient energy is available for this lifting. As soon as this is the case, a greatest possible insensitivity to disturbances from fluctuations of the input voltage is reached via the characteristic curve automatically for the conditions at the location of use, without that the conditions at the location of use must be known earlier at the factory.

A further advantage is that, via this targeted lifting of the voltage drop matched to the conditions at the location of use, the input impedance of the measuring device is increased. A high input impedance offers the advantage of a smaller attenuation of communication signals transmitted to the measuring device.

Moreover, via the targeted increasing of the voltage drop and therewith the increasing of the input impedance of the measuring device, the opportunity is provided to increase the number of measuring devices connectable parallel to one another to a single bus.

BRIEF DESCRIPTION OF THE DRAWINGS

The invention and other advantages will now be explained in greater detail based on the figures of the drawing presenting an example of an embodiment. Equal elements are provided in the figures with the equal reference characters. The figures of the drawing show as follows.

DETAILED DISCUSSION IN CONJUNCTION WITH THE DRAWINGS

Figure 1:
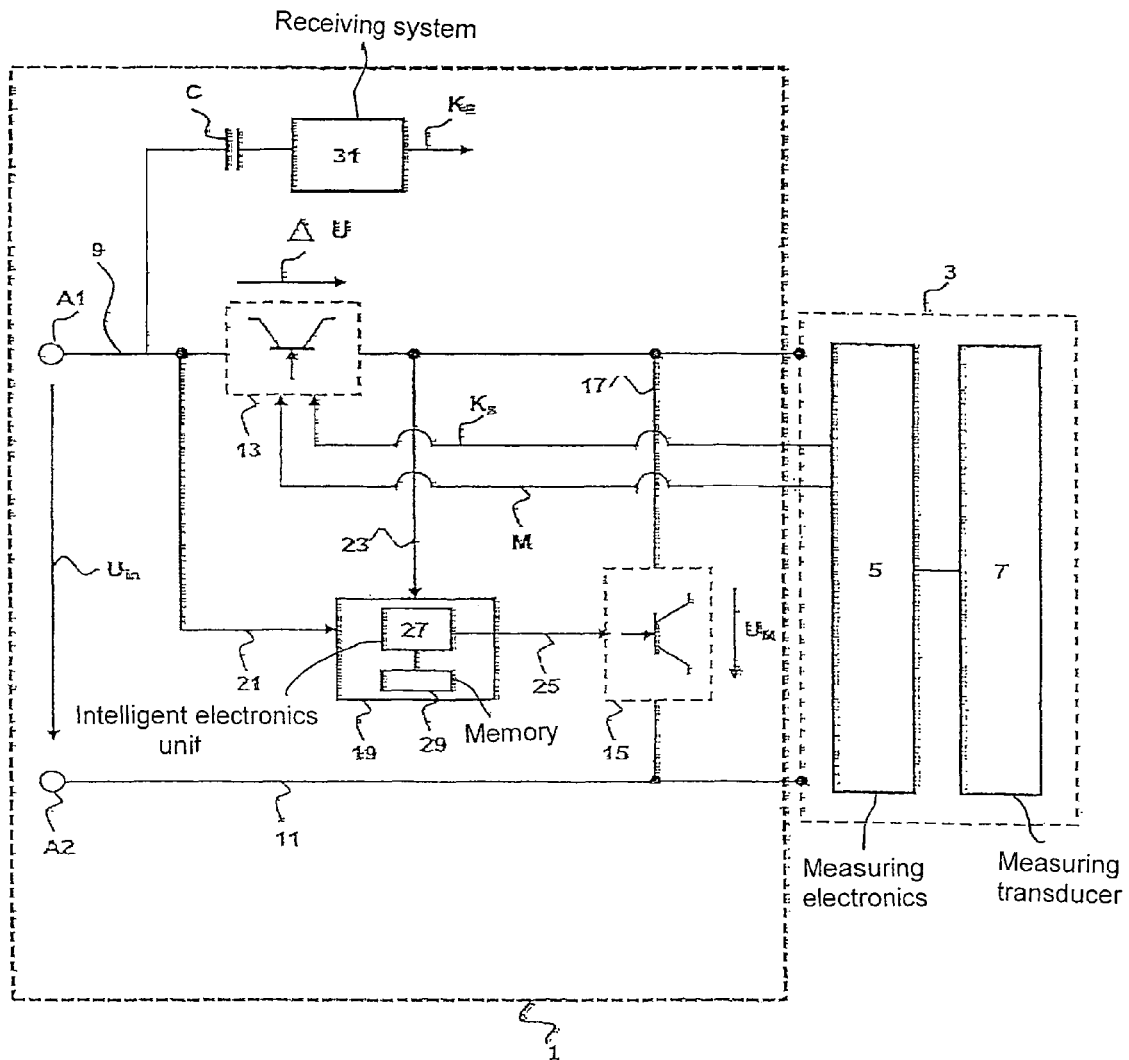
FIG. 1 is a block diagram of a measuring device of the invention.

FIG. 1 shows a block diagram of a measuring device of the invention for measuring a process variable, such as e.g. a pressure, a flow or a fill level.

The measuring device includes an input circuit 1 and a thereto connected, measuring sensor 3 supplied with energy via the input circuit 1. The measuring sensor 3 is, depending on the process variable to be measured, for example, a pressure measuring sensor, a flow sensor or a fill level measuring unit. The measuring sensor 3 serves for determining the process variable and for producing a measurement signal M representing the process variable. For this, it includes, for example, a measuring electronics 5 and, connected thereto, a measuring transducer 7, e.g. a probe.

The measuring device is connectable via a single line-pair, namely a supply line 9 and a return line 11, to a superordinated unit (not shown). During operation, energy supply of the measuring device and signal transmission, especially of an output signal representing the process variable, occurs between the measuring device and the superordinated unit via the line-pair. In operation, the superordinated unit provides an input voltage $U_{in}$ across the two terminals A1 and A2 of the input circuit. The input circuit 1 includes, installed in the supply line 9, a series regulator 13 (illustrated here only schematically), which serves to set an electrical current 1, which flows in the line-pair.

This happens preferably according to one of the above described standards.

Thus, the electrical current I flowing in the line-pair can be set by the series regulator 13, based on the measurement signal M supplied to the series regulator 13 from the measuring sensor 3, to an electrical current representing the measured process variable value, preferably an electrical current lying between 4 mA and 20 mA, which then is evaluated and correspondingly interpreted by the superordinated unit. Additionally, there can be superimposed on this electrical current representing the measured process variable value a communication signal Ks supplied to the series regulator 13, for example, likewise by the measuring electronics 5 of the measuring sensor 3. This is done by modulating, in accordance with a predetermined communication protocol, the electrical current value predetermined by the process variable. Preferably used for this is the communication protocol defined by the HART standard, in the case of which there is superimposed on the electrical current lying between 4 mA and 20 mA a high-frequency oscillation of +/−0.5 mA reflecting the communication signal $K_S$.

Alternatively, the electrical current flowing in the line-pair can be set to a predetermined electrical current value, independently of the measured process variable, for connecting the measuring device to a digital data bus, on which a communication signal, in the form a high-frequency oscillation is superimposed, for example, a communication signal $K_S$ produced by the measuring electronics 5 of the measuring sensor 3, especially a signal reflecting the measured process variable. Known standards for this are the PROFIBUS, FOUNDATION FIELDBUS and CAN-BUS standards.

In series after the series regulator 13, a shunt regulator 15 is connected in a parallel branch 17 connecting the supply line 9 with the return line. The input voltage $U_{in}$ corresponds therewith to a sum of a voltage drop ΔU present across the series regulator 13 and a voltage $U_M$ falling across the parallel branch 17. Voltage $U_M$ corresponds at the same time also to the supply voltage of the measuring sensor 3 arranged parallel to the parallel branch 17, behind the parallel branch 17.

According to the invention, an apparatus 19 for controlling the voltage drop ΔU across the series regulator 13 is provided, which sets the voltage drop ΔU as a function of the applied input voltage $U_{in}$ to a value predetermined by a characteristic curve $ΔU_{desired}(U_{in})$. The characteristic curve $ΔU_{desired}(U_{in})$ assigns to the possible input voltage values of the input voltage $U_{in}$ desired values $ΔU_{desired}$ for the voltage drop ΔU, which is set by the apparatus 19.

For this, the apparatus 19 determines via a first measurement line 21 connected to the supply line 9 before the series regulator 13 the input voltage $U_{in}$ and via the input voltage $U_{in}$ and a second measurement line 23 connected to the supply line 9 behind the series regulator 13 the voltage drop ΔU. The control of the voltage drop ΔU across the series regulator 13 occurs preferably via a corresponding operating of the shunt regulator 15, with which the apparatus 19 is connected for this via a control line 25.

The apparatus 19 can be a purely analog control circuit designed corresponding to the characteristic curve $\Delta U_{desired}(U_{in})$ and influencing, via a corresponding control of the shunt regulator 15, the voltage divider ratio of series regulator 13 and shunt regulator 15 relative to one another corresponding to the characteristic curve $\Delta U_{desired}(U_{in})$ in such a manner that there arises across the series regulator 13 the voltage drop $\Delta U_{desired}$ predetermined for the particular input voltage $U_{in}$.

Alternatively, the apparatus 19 for controlling the voltage drop $\Delta U$ can comprise—such as shown in FIG. 1—an intelligent electronics unit 27, especially a microprocessor or a microcontroller, which sets the voltage drop $\Delta U$ across the series regulator 13 to the value predetermined by the characteristic curve $\Delta U_{desired}(U_{in})$ based on the input voltage $U_{in}$ applied to the measuring device and the voltage drop $\Delta U$ across the series regulator 13 by a corresponding operating of the shunt regulator 15. In that case, the characteristic curve $\Delta U_{desired}(U_{in})$ is stored in a memory 29 associated with the intelligent electronics unit 27.

Figure 2:
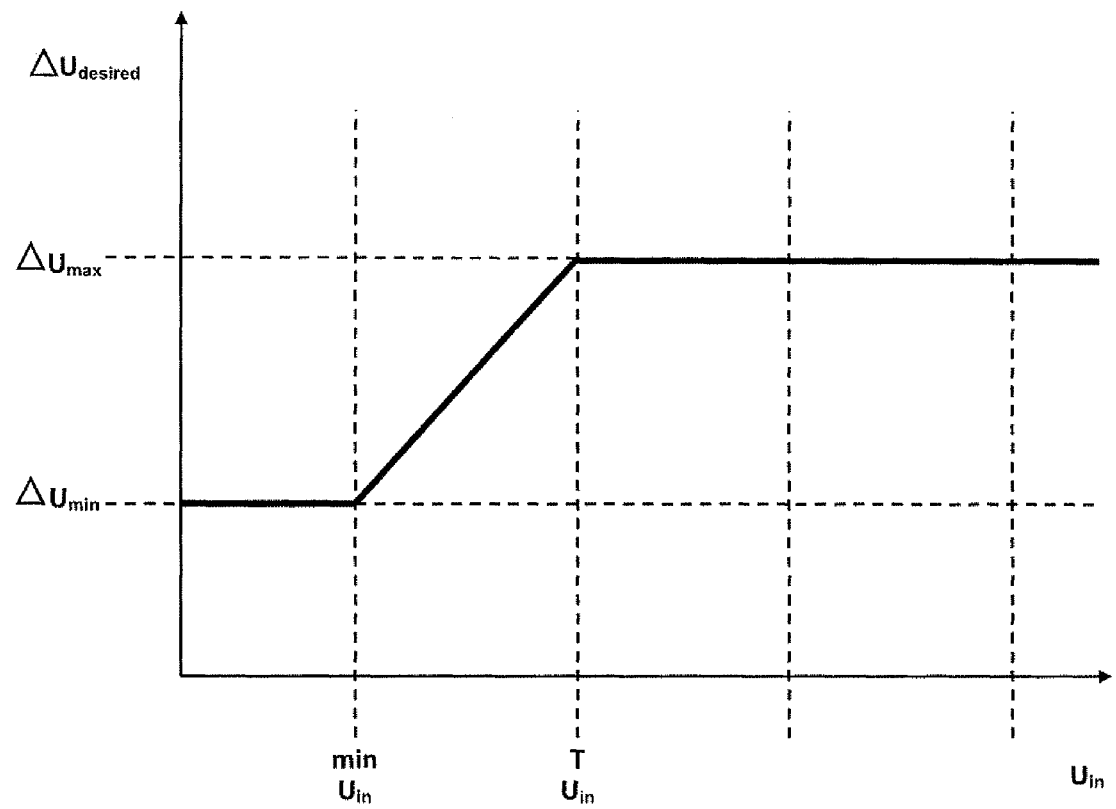
FIG. 2 is a characteristic curve for controlling voltage drop across the series regulator of FIG. 1 as a function of the input voltage.

The characteristic curve $\Delta U_{desired}(U_{in})$ is, for example, the characteristic curve illustrated in FIG. 2, in the case of which the desired value $\Delta U_{desired}$ for the voltage drop $\Delta U$ across the series regulator 13 in the case of low input voltages $U_{in}$ corresponds to a minimum value $\Delta U_{min}$ required for operation of the series regulator 13, and, as soon as the input voltage $U_{in}$ exceeds a predetermined minimum input voltage $U_{in}^{min}$, rises with rising input voltage $U_{in}$ to a predetermined maximum value $\Delta U_{max}$. The slope of the rise of the characteristic curve in the region between the minimum input voltage $U_{in}^{min}$ and a predetermined input voltage threshold $U_{in}^{T}$, in the case of which the maximum value $\Delta U_{max}$ is reached, is preferably matched to the energy requirement of the measuring sensor 3 taking into consideration the form selected for the transmission of the output signal representing the process variable, such as an electrical current value representing the process variable or such as a communication signal superimposed on a fixed electrical current value.

In this way, on the one hand, it is effected that the measuring sensor 3 in the case of low input voltages $U_{in}$ is fed as much energy as possible, in that here the losses across the series regulator 13 are held as small as possible. As soon as the measuring device, however, has more energy available via an input voltage $U_{in}$ exceeding the minimum input voltage $U_{in}^{min}$, the voltage drop $\Delta U$ across the series regulator 13 is increased above the minimum value $\Delta U_{min}$, and therewith the initially described disturbance sensitivity of the measuring device relative to fluctuations of the input voltage $U_{in}$ is clearly reduced.

In this way, the measuring sensor 3 is only fed as much energy as possible—to the detriment of insensitivity to disturbances—, when the measuring sensor 3 also actually absolutely requires such. As soon as this, due to a higher input voltage $U_{in}$, is no longer absolutely required, the voltage drop $\Delta U$ across the series regulator 13 is automatically increased via the apparatus 19, and therewith the insensitivity to disturbances improves.

Figure 3:
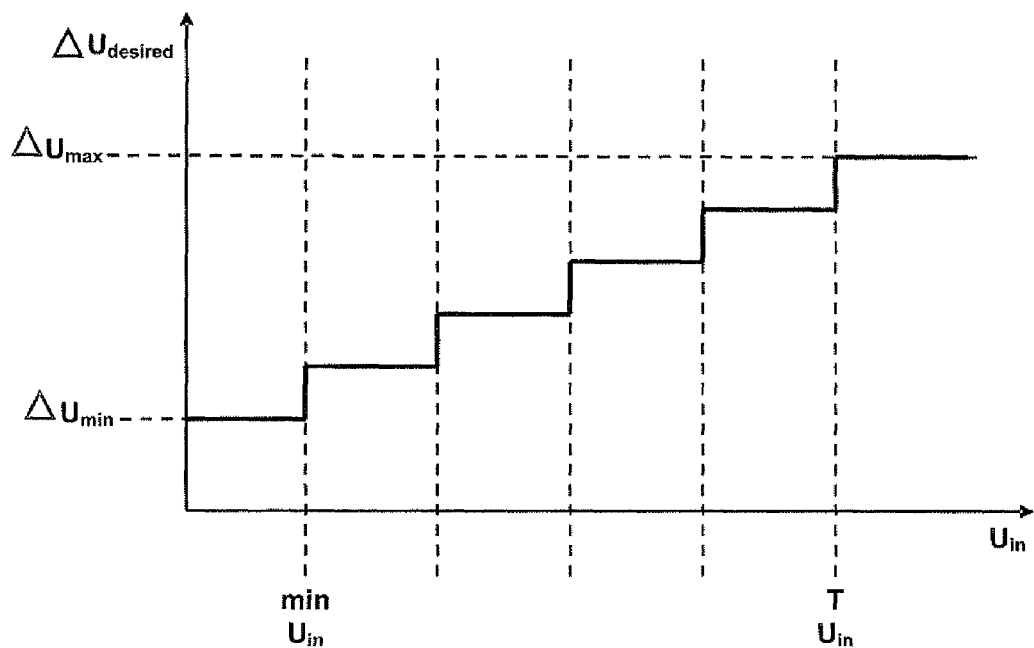
FIG. 3 is a step-shaped characteristic curve.
Figure 4:
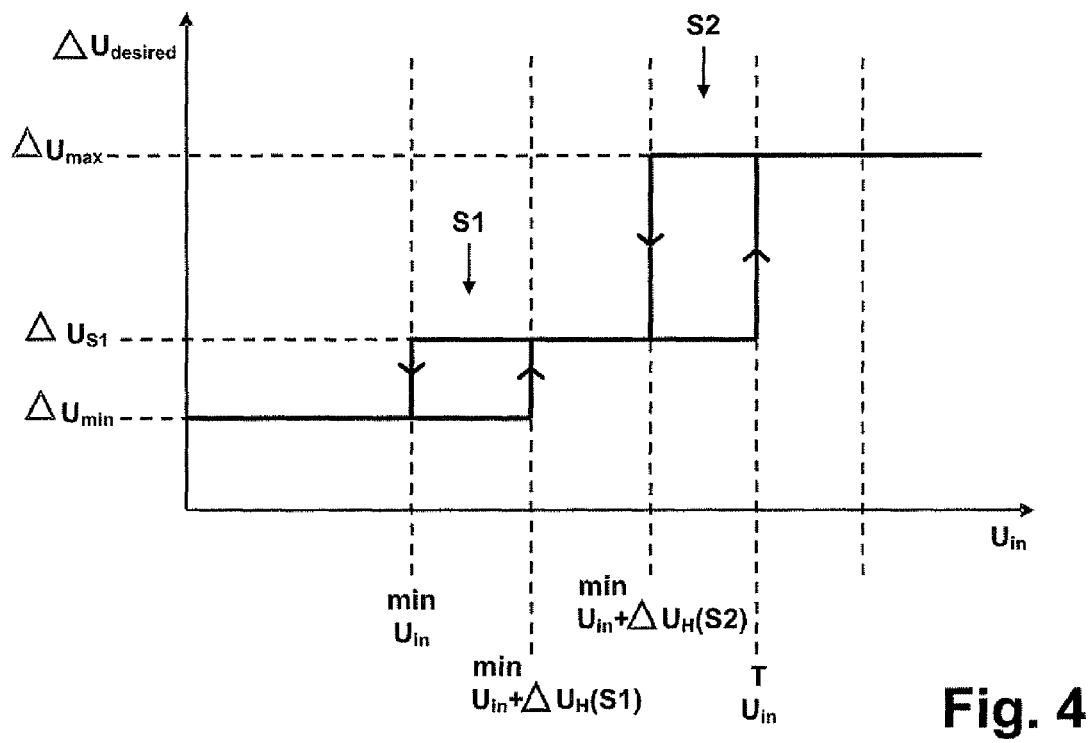
FIG. 4 is a step-shaped characteristic curve having hysteresis in the regions of steps.

FIGS. 3 and 4 show two other examples of embodiments for the characteristic curve $\Delta U_{desired}(U_{in})$, via which the voltage drop $\Delta U$ across the series regulator 13 is set.

In the example of an embodiment illustrated in FIG. 3, the value $\Delta U_{desired}$ predetermined for the voltage drop $\Delta U$ rises above the predetermined minimum input voltage $U_{in}^{min}$ as a function of the input voltage $U_{in}$ in the form of steps to the maximum value $\Delta U_{max}$.

In the example of an embodiment illustrated in FIG. 4, the characteristic curve $\Delta U_{desired}(U_{in})$ above the predetermined minimum input voltage $U_{in}^{min}$ has likewise a step shaped rise to the maximum value $\Delta U_{max}$. In contrast to the variant illustrated in FIG. 3, the characteristic curve $\Delta U_{desired}(U_{in})$ here has, however, at least in the region of one of the steps S1, S2, preferably—such as shown here—in the region of all steps S1, S2, a hysteresis of predetermined width $\Delta U_H(S1)$, $\Delta U_H(S2)$. The shown characteristic curve $\Delta U_{desired}(U_{in})$ includes, rising directly above the minimum input voltage $U_{in}^{min}$, a first step S1, in the case of which the desired value $\Delta U_{desired}$ of the voltage drop $\Delta U$ rises from the minimum value $\Delta U_{min}$ to a step of value $\Delta U_{S1}$, and, rising directly below the input voltage threshold $U_{in}^{T}$, a second step S2, in the case of which the desired value $\Delta U_{desired}$ of the voltage drop $\Delta U$ rises from the step value $\Delta U_{S1}$ to the maximum value $\Delta U_{max}$. The hystereses mean that the increasing of the voltage drop $\Delta U$ in the case of increasing input voltages $U_{in}$ occurs at the respective steps S1, S2 at higher input voltages $U_{in}$, than its lowering in the case of lessening input voltages $U_{in}$. In the illustrated example, the desired value $\Delta U_{desired}$ of the voltage drop $\Delta U$ in the case of rising input voltage $U_{in}$ accordingly rises at the input voltage $U_{in}^{min}+\Delta U_H(S1)$ to the step value $\Delta U_{S1}$, while the desired value $\Delta U_{desired}$ in the case of sinking input voltage $U_{in}$ falls at the minimum input voltage $U_{in}^{min}$ from the step value $\Delta U_{S1}$ to the minimum value $\Delta U_{min}$. Correspondingly, the desired value $\Delta U_{desired}$ of the voltage drop $\Delta U$ in the region the second step S2 in the case of rising input voltage $U_{in}$ rises only at the input voltage threshold $U_{in}^{T}$ to the maximum value $\Delta U_{max}$, while the desired value $\Delta U_{desired}$ in the case of sinking input voltage $U_{in}$, falls from the maximum value $U_{max}$ to the step value $\Delta U_S$ at the input voltage $U_{in}^{T}-\Delta U_H(S2)$ lying below the input voltage threshold $U_{in}^{T}$ by the hysteresis width $\Delta U_H(S2)$.

The hysteresis offers the advantage that a time stable voltage drop $\Delta U$ can be set, even when the input voltage $U_{in}$ fluctuates slightly around the threshold value of the respective step S1, S2, here the minimum input voltage $U_{in}^{min}$ in and the input voltage threshold $U_{in}^{T}$. This is especially advantageous when superimposed on the electrical current flowing in the line-pair are communication signals $K_S$ or $K_E$ generated by the measuring device or sent to the measuring device, since this can, in given circumstances, bring about small fluctuations of the input voltage $U_{in}$.

While in measuring devices with purely analog apparatus for setting the voltage drop $\Delta U$ across the series regulator 13 only a fixedly predetermined characteristic curve $\Delta U_{desired}(U_{in})$ can be implemented, the apparatus 19 shown here offers, due to the intelligent electronics unit 27, the opportunity to provide different characteristic curves $\Delta U_{desired}(U_{in})$ matched to particular fields of use for the measuring device. For this, the particular application-specific characteristic curve $\Delta U_{desired}(U_{in})$ can be stored in the memory 29 at the factory. Alternatively, interfaces of the measuring device present, as a rule, in any event can be utilized for implementing the respective application-specific characteristic curves $\Delta U_{desired}(U_{in})$. Thus, for example, a number of different characteristic curves $\Delta U_{desired}(U_{in})$, for example, distinguished by the rise of the desired value $\Delta U_{desired}$ for the voltage drop $\Delta U$, the input voltage threshold $U_{in}^{T}$ and/or the maximum value $\Delta U_{max}$, can be stored in the memory 29, from which the user selects, in the context of start-up of the device, via an interface enabling bidirectional communication, such as e.g. an user interface, the characteristic curve $\Delta U_{desired}(U_{in})$ best suitable for its application. Alternatively, also only the maximum value $\Delta U_{max}$ and/or the input voltage threshold $U_{in}^{T}$ can be selected application-specifically from a predetermined selection or specified by the user.

In the case of measuring devices, which—such as presented here—have a receiving system 31 for the receipt of communication signals $K_E$ superimposed on the electrical current I flowing in the line-pair, the specification of an application-specific characteristic curve $\Delta U_{desired}(U_{in})$, an application-specific maximum value $\Delta U_{max}$ and/or an application-specific input voltage threshold $U_{in}^T$ can also occur via the superordinated unit connected to the line-pair. The receiving system 31 is, for example, a modem, to which the communication signal $K_E$ is fed via a capacitor C connected to the supply line 9 on the input side before the series regulator 13. For this, the relevant communication signals $K_E$ can be fed in the measuring device either directly to the apparatus 19 for controlling the voltage drop $\Delta U$, or first processed in an additional circuit, for example, a circuit integrated in the measuring electronics 5, from which then the required information is fed to the intelligent unit 27.

In connection with measuring devices having a receiving system 31, the increasing the voltage drop $\Delta U$ across the series regulator 13 purposely performed as a function of the available input voltage $U_{in}$ offers the advantage that the entering communication signals $K_E$ are attenuated less, the higher the voltage drop $\Delta U$ across the series regulator 13 is.

In the case of measuring devices—such as the measuring device shown here—which include a bidirectional communication system for communication over the line-pair, the user can naturally likewise select via the superordinated unit from a predetermined selection of characteristic curves $\Delta U_{desired}(U_{in})$ stored in the measuring device, input voltage threshold values $U_{in}^T$ and/or maximum values $\Delta U_{max}$.

Figure 5:
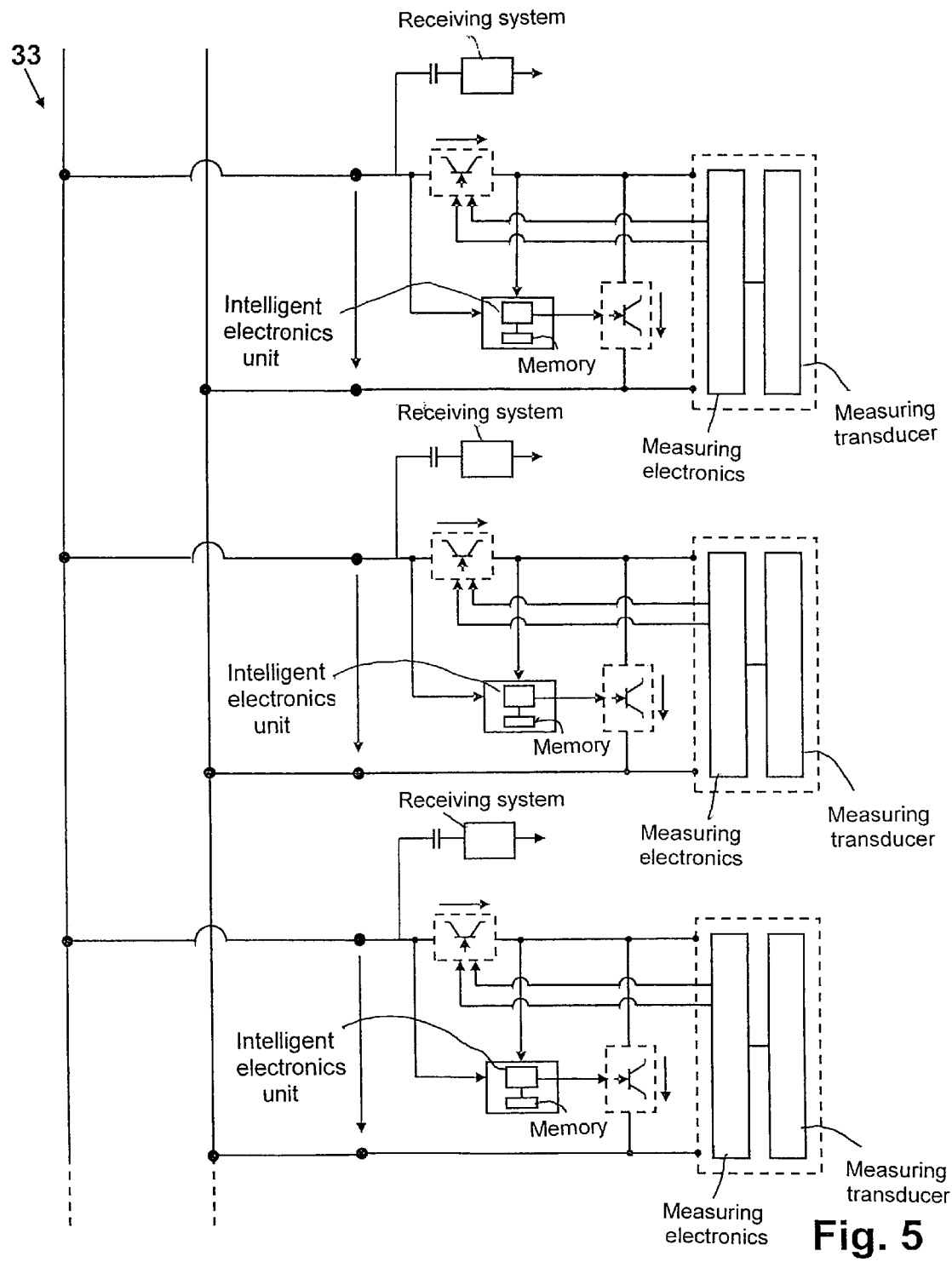
FIG. 5 shows a number of measuring devices of the inventions connected parallel to one another to a bus.

FIG. 5 shows a measuring arrangement in which a measuring device of the invention is connected via its line-pair to a bus 33 in parallel with additional measuring devices, in the example of an embodiment, measuring devices likewise of the invention. In these applications, the invention offers the advantage that the maximum value $\Delta U_{max}$ for the voltage drop $\Delta U$ can be predetermined as a function of the number of measuring devices connected, or to be connected, parallel to one another on the bus 33. In such case, the increasing of the voltage drop $\Delta U$ effects an increasing of the input impedance of the respective measuring device and leads as a consequence to a smaller loading of the bus 33 by the particular measuring device. Correspondingly, more measuring devices can be connected to the bus 33, as a function of how much higher their input impedances are.

Due to the setting of the voltage drop $\Delta U$ across the series regulator 13 controlled via the characteristic curve $\Delta U_{desired}(U_{in})$, the measuring device can now be applied extremely flexibly and offers in each application the maximum achievable insensitivity to disturbances for the input voltage ratios present there.

The invention claimed is:

1. A measuring device for measuring a process variable, comprising:
an input circuit, having:
a line-pair, namely a supply line and a return line, connectable to a superordinated unit, wherein, during operation, energy supply to the measuring device and signal transmission, of an output signal representing the process variable, between the measuring device and the superordinated unit occurs over said line-pair, and wherein, during operation, an input voltage is applied to the measuring device via said line-pair;
a series regulator installed in said supply line for controlling an electrical current flowing via said line-pair;
a shunt regulator connected after said series regulator and installed in a parallel branch connecting said supply line with said return line; and
an apparatus for controlling a voltage drop across said series regulator, wherein:
said apparatus sets the voltage drop across said series regulator as a function of the applied input voltage for input voltages, which are greater than a predetermined minimum input voltage, to a value predetermined by a characteristic curve for a particular input voltage and lying above a minimum value required for operation of said series regulator;
a measuring sensor connected to said input circuit and supplied with energy via said input circuit for measuring the process variable; and
the predetermined value of the voltage drop for input voltages, which lie above the predetermined minimum input voltage, rises with rising input voltage to a predetermined maximum value.

2. The measuring device as claimed in claim 1, wherein:
the characteristic curve has a step shaped curve, which has a hysteresis in the region of at least one of the steps of the step shaped curve.

3. The measuring device as claimed in claim 1, wherein:
said apparatus sets the voltage drop across said series regulator for input voltages, which lie below said predetermined minimum input voltage, to a minimum value required for operation of said series regulator.

4. The measuring device as claimed in claim 1, wherein:
said series regulator controls the electrical current as a function of a measurement signal, said measuring sensor representing the measured process variable to a value representing the process variable.

5. The measuring device as claimed in claim 1, wherein:
said series regulator modulates the electrical current as a function of a signal to be transmitted from the measuring device to the superordinated unit.

6. The measuring device as claimed in claim 1, wherein:
said apparatus for setting the voltage drop includes a microprocessor or a microcontroller intelligent electronics unit, which, by a corresponding operation of said shunt regulator, sets the voltage drop across said series regulator, based on the input voltage applied to the measuring device and the voltage drop across the series regulator, to the value predetermined by the characteristic curve.

7. The measuring device as claimed in claim 6, further comprising:
a receiving system, via which the characteristic curve is specified to said intelligent electronics unit.

8. The measuring device as claimed in claim 6, further comprising:
a receiving system, via which the maximum value and/or an input voltage threshold, at which the maximum value is reached, is specified to said intelligent electronics unit.

9. The measuring device as claimed in claim 6, wherein:
a selection of different characteristic curves is stored in the measuring device; and
the measuring device includes a bidirectional communication system, via which the characteristic curve is selectable from the predetermined selection.

10. A measuring arrangement having at least one measuring device with an input circuit having:
a line-pair, namely a supply line and a return line, connectable to a superordinated unit, wherein, during operation, energy supply to the measuring device and signal transmission, of an output signal representing the process variable, between the measuring device and the superordinated unit occurs over said line-pair, and wherein, during operation, an input voltage is applied to the measuring device via said line-pair;
a series regulator installed in said supply line for controlling an electrical current flowing via said line-pair;
a shunt regulator connected after said series regulator and installed in a parallel branch connecting said supply line with said return line; and
an apparatus for controlling a voltage drop across said series regulator, wherein said apparatus sets the voltage drop across said series regulator as a function of the applied input voltage for input voltages, which are greater than a predetermined minimum input voltage, to a value predetermined by a characteristic curve for the particular input voltage and lying above a minimum value required for operation of said series regulator; and
a measuring sensor connected to said input circuit and supplied with energy via said input circuit for measuring the process variable, wherein:
said measuring device is connected via its line-pair to a bus in parallel with at least one additional measuring device; and
a maximum value voltage is a value predetermined as a function of a number of the measuring devices connected to the bus parallel to one another.

11. A measuring device for measuring a process variable, comprising:
an input circuit, having:
a line-pair, namely a supply line and a return line, connectable to a superordinated unit, wherein, during operation, energy supply to the measuring device and signal transmission, of an output signal representing the process variable, between the measuring device and the superordinated unit occurs over said line-pair, and wherein, during operation, an input voltage is applied to the measuring device via said line-pair;
a series regulator installed in said supply line for controlling an electrical current flowing via said line-pair;
a shunt regulator connected after said series regulator and installed in a parallel branch connecting said supply line with said return line; and
an apparatus for controlling a voltage drop across said series regulator, wherein:
said apparatus sets the voltage drop across said series regulator as a function of the applied input voltage for input voltages, which are greater than a predetermined minimum input voltage, to a value predetermined by a characteristic curve for a particular input voltage and lying above a minimum value required for operation of said series regulator;
a measuring sensor connected to said input circuit and supplied with energy via said input circuit for measuring the process variable; and
the characteristic curve has a step shaped curve.

12. The measuring device as claimed in claim 11, wherein:
said step shaped curve has a hysteresis in the region of at least one of the steps of said step shaped curve.

* * * * *